(12) United States Patent
Rice

(10) Patent No.: US 8,187,724 B2
(45) Date of Patent: May 29, 2012

(54) METHOD OF MANUFACTURE OF A DUAL ALLOY IMPELLER

(75) Inventor: Derek Anthony Rice, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 450 days.

(21) Appl. No.: 12/391,942

(22) Filed: Feb. 24, 2009

(65) Prior Publication Data

US 2010/0215978 A1    Aug. 26, 2010

(51) Int. Cl.
- B32B 15/01 (2006.01)
- B22F 1/00 (2006.01)
- B22F 3/15 (2006.01)
- B23K 20/12 (2006.01)
- B23K 20/00 (2006.01)

(52) U.S. Cl. ..... 428/680; 428/615; 428/577; 416/241 R; 416/210 A; 416/244 A; 416/204 A

(58) Field of Classification Search .................. None
See application file for complete search history.

(56) References Cited

U.S. PATENT DOCUMENTS

| | | | |
|---|---|---|---|
| 2,910,356 A | 10/1959 | Grala et al. | |
| 3,940,268 A * | 2/1976 | Catlin | 419/8 |
| 4,096,615 A * | 6/1978 | Cross | 29/889.21 |
| 4,152,816 A | 5/1979 | Ewing et al. | |
| 4,186,473 A * | 2/1980 | Cross et al. | 29/889.2 |
| 4,270,256 A * | 6/1981 | Ewing | 29/889.21 |
| 4,335,997 A * | 6/1982 | Ewing et al. | 416/185 |
| 4,529,452 A * | 7/1985 | Walker | 148/527 |
| 4,578,700 A * | 3/1986 | Roberts et al. | 725/11 |
| 4,581,300 A | 4/1986 | Hoppin, III et al. | |
| 4,587,700 A | 5/1986 | Curbishley et al. | |
| 4,722,469 A | 2/1988 | Rydstad et al. | |
| 4,825,522 A | 5/1989 | Iwai et al. | |
| 4,907,947 A | 3/1990 | Hoppin, III | |
| 5,100,050 A * | 3/1992 | Krueger et al. | 228/265 |
| 5,106,012 A * | 4/1992 | Hyzak et al. | 228/265 |
| 5,116,691 A | 5/1992 | Darolia et al. | |
| 5,143,563 A | 9/1992 | Krueger et al. | |
| 5,161,950 A | 11/1992 | Krueger et al. | |
| 5,348,446 A * | 9/1994 | Lee et al. | 416/241 R |
| 5,527,402 A | 6/1996 | Ganesh et al. | |
| 5,725,691 A | 3/1998 | Liu | |
| 5,935,349 A | 8/1999 | Sauthoff et al. | |
| 6,478,896 B1 | 11/2002 | Ganesh et al. | |
| 7,431,564 B2 * | 10/2008 | Newman | 416/193 A |
| 7,832,986 B2 * | 11/2010 | Baker et al. | 416/96 R |
| 2007/0081912 A1 * | 4/2007 | Hann et al. | 419/6 |
| 2008/0219853 A1 | 9/2008 | Baker et al. | |

* cited by examiner

*Primary Examiner* — Aaron Austin
(74) *Attorney, Agent, or Firm* — Ingrassia Fisher & Lorenz, P.C.

(57) ABSTRACT

There is provided a method for fabricating a dual alloy structure that may in turn be machined to fabricate a rotary component for use in a gas turbine engine. The method provides a powder metal (PM) nickel based superalloy and a nickel aluminide intermetallic based alloy. The powder metal (PM) nickel based superalloy displays characteristics, such as improved strength, low cycle fatigue resistance, fracture toughness, and crack growth resistance. The nickel aluminide intermetallic based alloy displays characteristics, such as high temperature creep and oxidation resistance, suitable for use in the outer radial area of an impeller. A bore sub-element is fabricated from the powder metal (PM) nickel based superalloy. A body sub-element is fabricated from the nickel aluminide intermetallic based alloy. The bore sub-element and body sub-element are joined by inertia welding or diffusion bonding at a common mating surface.

15 Claims, 4 Drawing Sheets

METHOD OF MANUFACTURE OF A DUAL ALLOY IMPELLER

TECHNICAL FIELD

The present invention relates to methods and materials for manufacturing gas turbine engine components. More particularly the invention relates to improved methods and materials with which to manufacture impellers and impeller-like rotating components comprising more than one alloy.

BACKGROUND

In an attempt to increase the efficiencies and performance of contemporary jet engines, and gas turbine engines generally, engineers have progressively pushed the engine environment to more extreme operating conditions. The harsh operating conditions of high temperature and pressure that are now frequently projected place increased demands on engine components and materials. Indeed the gradual change in engine design has come about in part due to the increased strength and durability of new materials that can withstand the operating conditions present in the modern gas turbine engine.

The compressor stage of the gas turbine engine is one area that has seen increased demands placed on it. For example, increasing performance and reliability demands for gas turbine engines require both high compression ratios and reduced compression stages. Relatively higher compression ratios in turn result in high compressor discharge temperatures. A reduced number of compression stages to accomplish higher compression ratios results in higher compressor stage tip speeds and higher bore stresses. These combined demands have made it very difficult to utilize monolithic alloy impellers for high pressure compressor (HPC) stages of gas turbine engines. It would thus be desirable to develop a high pressure impeller that can withstand the increased pressures and temperatures associated with gas turbine engines. It is also desired that the impeller design be suitable to relatively smaller gas turbine engines. It has therefore been conceived that a dual alloy approach, combining a high strength bore alloy and a high temperature outer blade ring material, offers a viable solution.

A rotary compressor such as an impeller undergoes differing stresses at differing locations. Typically a central opening or bore defines an axis about which the rotor spins. In the case of an HPC impeller, multiple airfoils extend radially outward from a bore and axially along the length of the bore. Additionally impellers wrap tangentially, from an inducer section near the inner diameter to the exducer near the impeller outer diameter. In operation, an impeller receives a fluid, such as air, at an upstream axial position. Due to the rotational movement of the impeller, the air is compressed. Typically, a given volume of air that is being compressed is passed from an upstream position to a downstream position in the impeller. As the air exits the impeller, at an outwardly radial position, it is at a relatively higher pressure and temperature than it was when the air first contacted the impeller.

It should be noted that this general structure of a gas turbine impeller is also true of other rotary devices such as turbines found in turbochargers and turbopumps. The principles of the invention described herein are thus applicable to these devices as well.

As mentioned, an impeller is characterized by differing stresses at different impeller locations. Stresses due to rotation are greatest in the bore section. These stresses arise as a result of the high centrifugal forces that develop during high RPM operation. It is this area where cracks tend to develop and propagate. Hence, it is an important design criterion that materials in this area of the impeller have relatively high strength characteristics.

Differences in temperature also occur at different points in an operating impeller. As previously noted, air enters an individual impeller at a relatively lower temperature and pressure. When this same air exits the impeller it is at a relatively higher temperature and pressure. Thus, the upstream leading edge of an impeller airfoil at the inducer experiences relatively lower temperatures; and the outer radial edge of an impeller, the area where compressed gas exits, the exducer, experiences relatively higher temperatures. As a consequence, materials used in the gas exiting region must be selected to withstand these high temperatures.

Hence there is a need for an improved impeller design and method to manufacture the same. The improved design should take advantage of material characteristics that provide high strength and high temperature performance. It is desired that the impeller, and the method of manufacturing the impeller, provide improved strength performance in bore regions while also providing improved high temperature performance in the outward radial positions. There is a need that the improved impeller design maintains advantageous weight performance of materials. The present invention addresses one or more of these needs.

BRIEF SUMMARY

The present invention provides a method and materials for fabricating a dual alloy gas turbine engine rotor. In particular, the method may be applied to dual alloy impellers characterized as withstanding operating temperatures in excess of approximately 1200° F. (650° C.). The method includes solid state diffusion bonding technology or inertia welding to obtain reproducible, high quality adhesion between impeller subcomponents and further control residual stresses and impart microstructures appropriate for the end use application.

In one embodiment, and by way of example only, there is provided a method for fabricating a machinable structure comprising the steps of: providing a bore sub-element comprising a $\gamma/\gamma'$ powder metal (PM) nickel based superalloy; providing a body sub-element comprising a nickel aluminide intermetallic based alloy, the nickel aluminide intermetallic based alloy having improved strength and oxidation resistance when exposed to temperatures in a range of between about 1250° F. to about 1500° F., that is greater than a strength of the $\gamma/\gamma'$ powder metal (PM)nickel based superalloy, when the $\gamma/\gamma'$ powder metal (PM) nickel based superalloy is exposed to temperatures in the range; contacting the bore sub-element and the body sub-element; joining the bore sub-element and the body sub-element; and machining to define the machinable structure.

In a further embodiment, still by way of example only, there is provided a method for fabricating a composite structure comprising: providing a nickel based superalloy with high strength properties; forming the nickel based superalloy into a bore sub-element having a mating surface; providing a nickel aluminide intermetallic based alloy with high creep resistance and oxidation resistance properties when exposed to temperatures in a range of between about 1250° F. to about 1500° F. that is more than the strength and oxidation resistance of the nickel based superalloy, when the nickel based superalloy is exposed to temperatures in the range; forming the nickel aluminide intermetallic based alloy into a body sub-element having a mating surface; joining the bore sub-element to the body sub-element so as to form an intermediate structure; and machining the intermediate structure.

In a further embodiment, still by way of example only, there is provided a structure suitable for processing into a turbine impeller comprising: a bore sub-element wherein the bore sub-element comprises a powder metal (PM) nickel based superalloy with high strength properties; and a body sub-element wherein the body sub-element comprises a nickel aluminide intermetallic based alloy and wherein the bore sub-element and the body sub-element are joined at a mating interface.

Other independent features and advantages of the method to fabricate a dual alloy impeller will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figure, wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
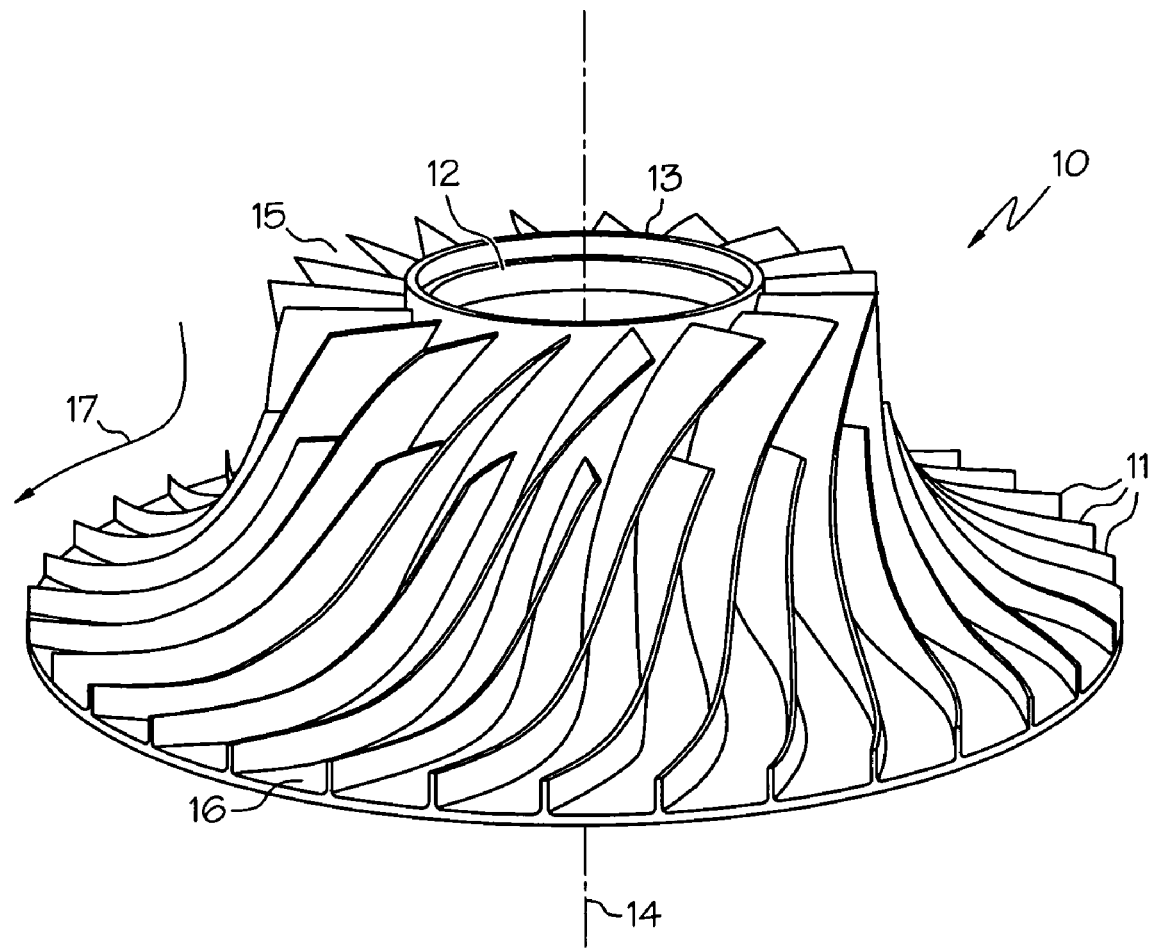
FIG. 1 is a schematic view of a prior art impeller.

Referring now to FIG. 1 there is shown a representation of a typical impeller suitable for use with the present invention. An impeller 10 includes a plurality of impeller airfoils 11 attached to a central core 12. The impeller 10 has a generally radial structure and, as shown in FIG. 1, a central bore area 13. In some designs, the impeller 10 is fabricated as a unitary piece with an axle and would not have an open bore area though it would have the corresponding bore region. The central bore area 13 is aligned along an imaginary central axis 14 that runs through the central bore area 13 in an axial direction. In operation, the impeller 10 is disposed on a central axle (not shown) at the central bore area 13 and rotates thereon or rotates with the axle. The plurality of impeller airfoils 11 extend from the central bore area 13 in an outwardly radial and axial direction. The impeller 10 further defines an upstream position 15 and a downstream position 16. The upstream position 15 and the downstream position 16 correspond to the fluid path flow through and across the impeller 10. Fluid, air, first enters the impeller 10 at the upstream position 15 (inducer). As air passes the impeller 10 it exits in the downstream position 16 (exducer). Air passing across the impeller 10 is pressurized such that the air exiting the impeller 10 is at a higher temperature and pressure relative to the air entering the impeller 10. The direction of an air flow 17 is across the face of the impeller 10, the face being that portion of the impeller 10 which is exposed to air flow. In operation, the impeller 10 is disposed within a housing or structure (not shown) which, by close proximity to the plurality of impeller airfoils 11, assists in placing the air under pressure.

In the impeller configuration as shown in FIG. 1, the plurality of impeller airfoils 11 press against air as the impeller 10 rotates. The plurality of impeller airfoils 11 act to compress the air. The rotation of the impeller 10 during this compression imparts high tensile stresses in the central bore area 13. Simultaneously, air that exits the impeller 10 at the downstream position 16 (exducer) is typically at a much higher temperature than compared to the air entering in the upstream position 15 (inducer). Temperatures in excess of 1000° F. (537.8 degree Celsius) can be experienced at the downstream position 16 (exducer). Thus, the structure in the downstream position 16 and on a back face 24 (FIG. 2) are particularly subject to high temperature creep and fatigue.

It has now been discovered that an impeller can be designed and manufactured so that the impeller is comprised of multiple alloys. In one preferred embodiment, dual alloys are joined to form an intermediate structure that may itself be further processed into a finished impeller. The finished impeller thus incorporates the dual alloys of the intermediate structure.

The combination of materials to create the intermediate structure is selected so that material performance is optimized given the location of the material in the final product. The material that will be proximate to the bore of the impeller is selected for suitable strength properties. Similarly, the material placed in the area of the fluid exit is chosen for suitable high temperature properties. Referring now to FIGS. 2, 3, 4, and 5 there are illustrated exemplary embodiments of the material selection in a silhouette of an impeller cross-section. In each illustration, a region 20 represents a bore sub-element, and a region 22 represents a body, or rim, sub-element. As shown, the bore sub-element 20 and the body sub-element 22 can be fashioned so that a chosen material extends to a finished location on the impeller.

Figure 2:
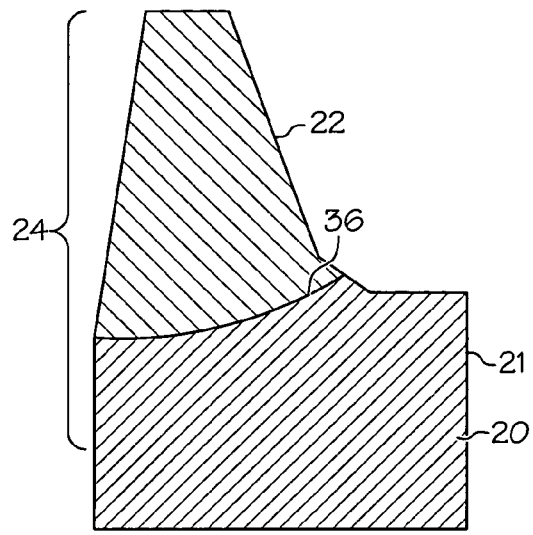
FIG. 2 is a side view of an impeller cross section illustrating dual alloys according to an embodiment of the present invention.
Figure 3:
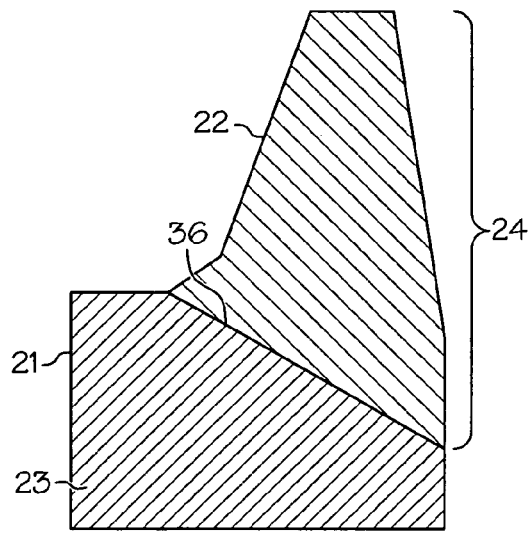
FIG. 3 is a side view of an impeller cross section illustrating dual alloys according to an embodiment of the present invention.
Figure 4:
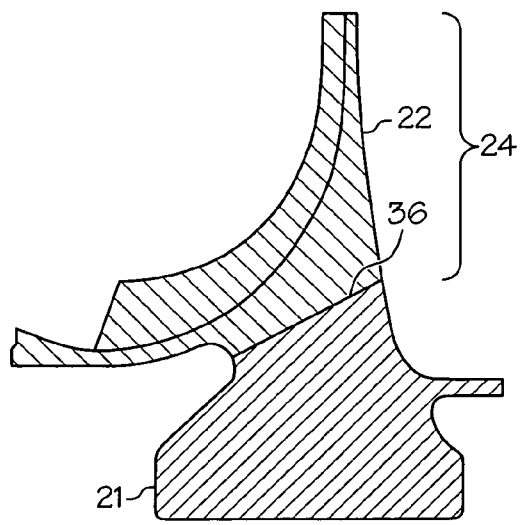
FIG. 4 is a side view of an impeller cross section illustrating dual alloys according to an embodiment of the present invention.
Figure 5:
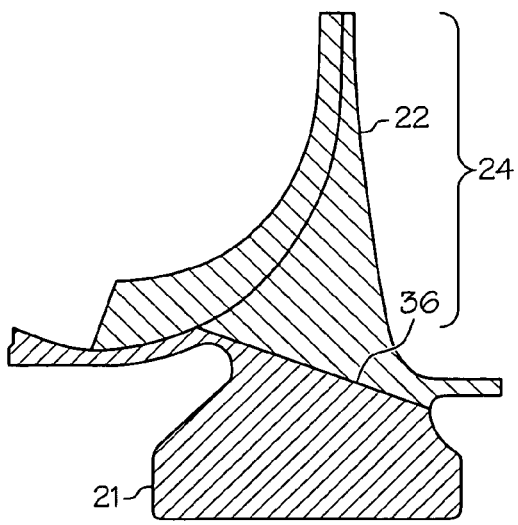
FIG. 5 is a side view of an impeller cross section illustrating dual alloys according to an embodiment of the present invention.

The back face 24 of the impeller cross section is indicated in FIG. 2. The back face 24 is an area of an impeller where the elevated temperature properties of the material are important. Although the temperature is higher at the blade tip, the stress is also lower at the tip. It has been discovered that the back face 24 is generally an area where the stress and temperature combination becomes more critical. Thus, in a preferred embodiment, the composition of the region of the back face 24 is considered with respect to creep resistance.

Figure 6:
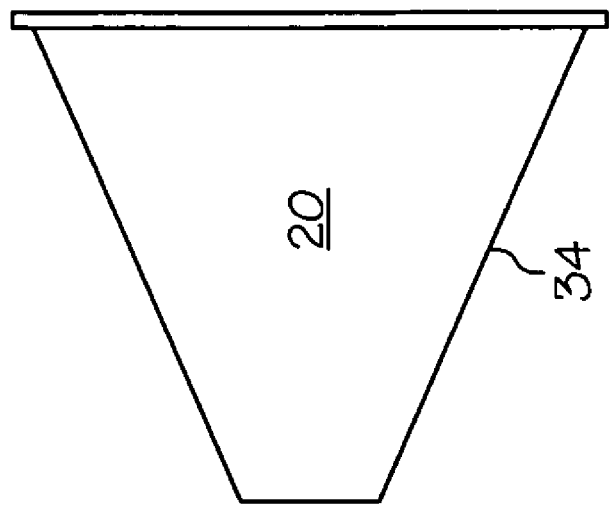
FIG. 6 is a perspective view of a bore sub-element and body sub-element according to an embodiment of the present invention.
Figure 6:
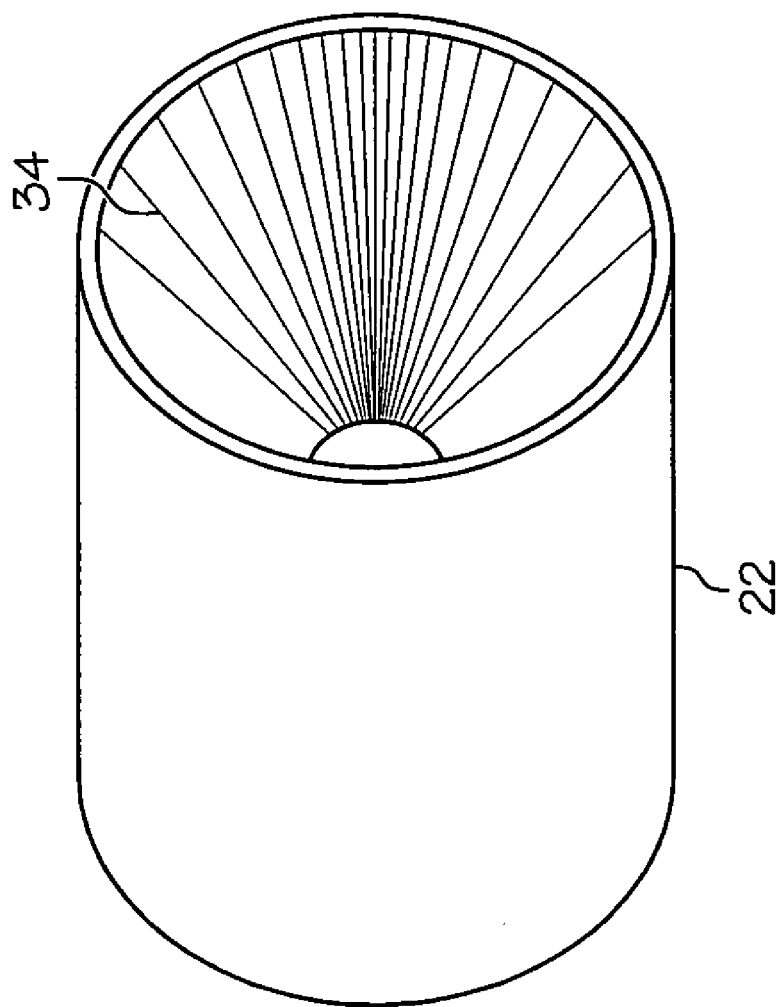
Figure 7:
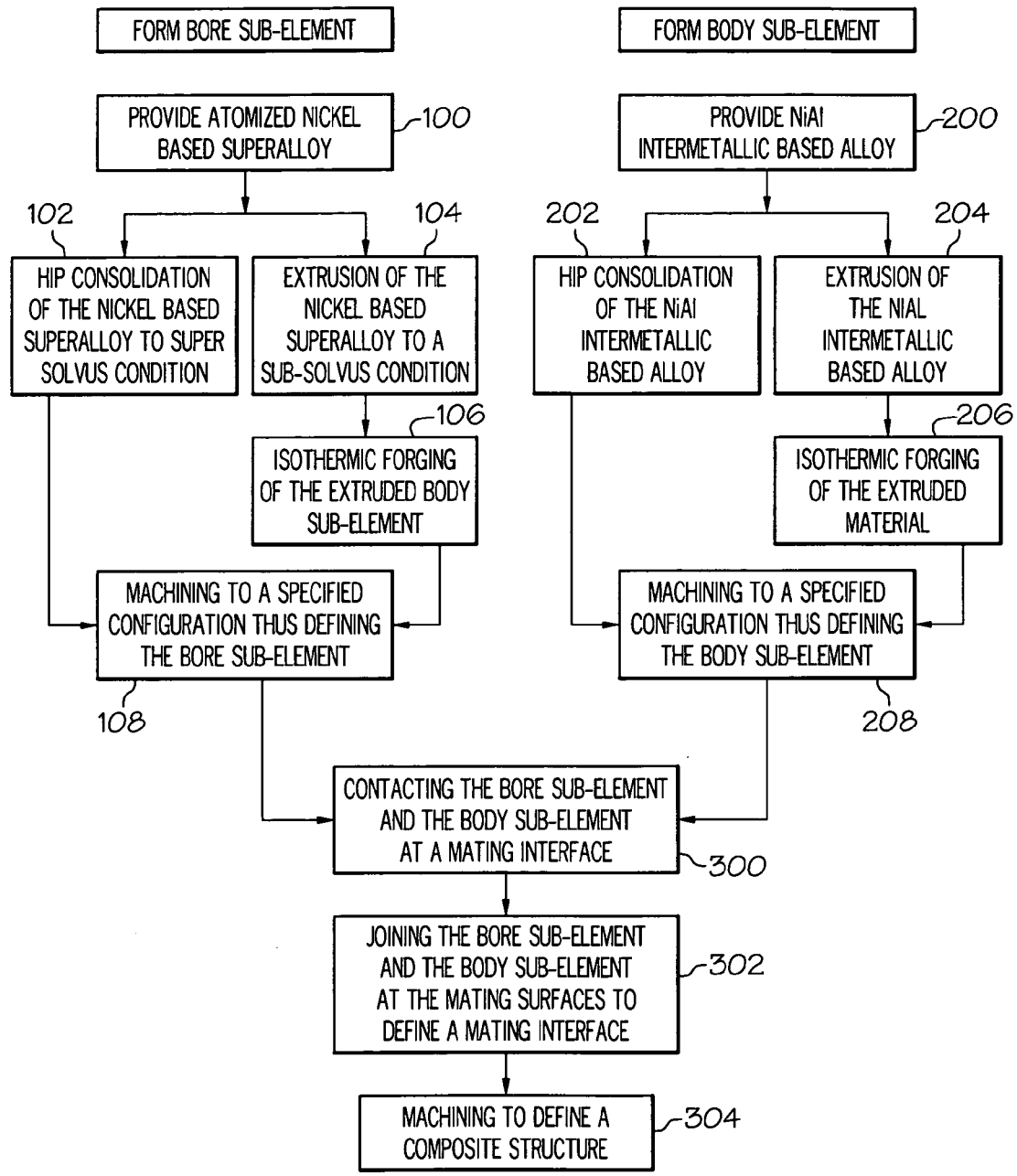
FIG. 7 is a flow chart depicting an exemplary method for forming an impeller structure according to an embodiment of the present invention.

A preferred method to manufacture the dual alloy impeller is further illustrated in FIGS. 6 and 7. More specifically, FIG. 6 illustrates a bore sub-element 20 and a body sub-element 22. The bore sub-element 20 and the body sub-element 22 are configured so that they may be brought together in close mating alignment. In a preferred embodiment, the bore sub-element 20 and the body sub-element 22 are brought into mating alignment along corresponding mating surfaces 34, thus forming a mating interface (described presently) when joined. In a preferred embodiment illustrated in FIG. 6, the bore sub-element 20 is generally conical in shape. The mating surface 34 of the bore sub-element 20 follows the line of the conical shape. Similarly, the body sub-element 22 has a hollow that is in conical form. The mating surface 34 on the body sub-element 22 also follows the conical shape. Subsequent to joining of the mating surfaces 34, a mating interface 36 is formed, wherein the slope of the mating interface 36, in various embodiments, is illustrated in FIGS. 2, 3, 4, and 5. Each of these figures illustrates the mating interface 36 having a different slope and/or position. When brought into close mating alignment, the bore sub-element 20 and the body sub-element 22 are in substantial contact along the mating interface 36. Preferably, the contact is sufficient so that the bore sub-element 20 and the body sub-element 22 may be joined at the mating interface 36 through diffusion bonding techniques or inertia welding techniques, as described below.

Each of the bore sub-element 20 and the body sub-element 22 may be formed through known methods of powder metallurgy, extrusion, forging, and machining (described presently). The mating surfaces 34 on the both bore sub-element 20 and the body sub-element 22 may be formed through these known methods. The bore sub-element 20 and the body sub-element 22 may include flanges, thrust faces, and other shapes that assist in the manufacture process. The body sub-element 22 may include the airfoils described in FIG. 1 or material from which such airfoils may subsequently be formed.

Referring again to FIG. 6, the bore sub-element 20 and the body sub-element 22 can be joined at the mating interface 36 through solid state diffusion bonding techniques or inertia welding techniques. The solid state diffusion bonding techniques may include a vacuum braze followed by a hot isostatic pressing (HIP) diffusion cycle. Upon completion of the joining operation, what remains is an intermediate structure that includes both the original bore sub-element 20 and the body sub-element 22. The joint between the two pieces is sufficiently strong and secure that the intermediate structure can be further machined and formed to create the finished impeller shape. Further, the bond is sufficiently strong to allow the joined pieces, when machined, to operate as an impeller.

In a preferred embodiment, dual alloy combinations are selected from high strength alloys and superalloys. Alloys that may be utilized for the bore sub-element 20 include a powder metal (PM) nickel (Ni) based superalloy such as an atomized powder metal (PM) alloy 10. The bore sub-element materials are chosen due to their inherent low cycle fatigue (LCF) and tensile properties at bore conditions, typically at or near 1250° F. (676.7 degree Celsius). In one particular embodiment, the bore sub-element 20 is formed of a γ/γ' PM nickel based superalloy. Alloys that may be utilized for the body sub-element 22 include those with excellent oxidation and creep/stress rupture properties at or near 1450° F. (787.8 degree Celsius). More specifically, the body sub-element 22 is preferably formed of a $Ni_3Al$ intermetallic based alloy or any enhanced version of this alloy having a strength when exposed to temperatures in a range of between about 1250° F. (676.7 degree Celsius) to about 1500° F. (815.6 degree Celsius) that is greater than a strength and oxidation resistance of the PM nickel based superalloy that forms the bore sub-element 20, when the PM nickel based superalloy is exposed to temperatures in the same range. Furthermore, alloys that may be utilized for the body sub-element 22 include derivations of alloy $Ni_3Al$, where chemistry modifications, or novel manufacturing methods, enable improved mechanical properties and oxidation resistance of the material in the thermal range of interest (1200 F to 1500 F).

A preferred embodiment has been described as a method to fabricate an intermediate structure from two pieces. However, multiple pieces may be used to fabricate the intermediate structure. Further, the finished impeller may be fabricated of multiple regions having different compositions. Likewise, it is preferred that the mating interface 36 be linear in cross section. However, other shapes for the mating surfaces 34 and mating interface 36 may be employed. For example, in cross section, the mating interface 36 may include composite lines of differing angles, curves, or other complex shapes.

As illustrated in FIG. 6, the bore sub-element 20 and the body sub-element 22 contain excess material, material that will ultimately be machined away in order to yield a finished impeller shape. Both the bore sub-element 20 and the body sub-element 22 may themselves be cast, forged or formed by powder metallurgy techniques or otherwise machined so as to minimize the material that must be removed in order to create the impeller. Thus, the body sub-element 22 need not have an outer shape in the form of a cylinder, but may take other shapes. The bore sub-element 20 may initially be formed so that it has a hollow axial area (not shown) that corresponds to where a central bore area would appear, if such an area is part of the design of a finished impeller such as the central bore area 13 of FIG. 1. Alternatively, the bore sub-element 20 may be formed with an integral axle.

Turning now to FIG. 7, an exemplary method for forming an impeller structure is outlined in a flow diagram. In a preferred embodiment, a bore sub-element and a body sub-element are separately formed prior to joining. For purposes of explanation, the following description outlines formation of a bore sub-element first, but it should be understood that in an alternate embodiment a body sub-element may be formed first, or simultaneously with the formation of the bore sub-element. Accordingly, provided as step 100 is an atomized nickel based superalloy material for fabricating a bore sub-element, similar to the bore sub-element described in FIG. 6. In one embodiment, the atomized nickel based superalloy undergoes hot isostatic pressing (HIP) as step 102 to a super solvus condition. More specifically, the PM nickel based superalloy material is subjected to elevated temperatures and pressures to form a fully dense compacted billet. In a preferred embodiment, the material undergoes HIP processing to a grain size in a range of ASTM 6.0-8.0, and preferably a grain size of ASTM 7.5. HIP processing allows for the formation of the bore sub-element of uniform grain size and fully dense billet adequate for inspection using available technologies. The consolidated material is next machined into a specified configuration, as step 108 and definition of the final bore sub-element.

In an alternate embodiment, the atomized PM nickel based superalloy may undergo an extruding process as step 104 and isothermal forging as step 106 to a grain size in a range of ASTM 10.0-12.0, and preferably a grain size of ASTM 11.5. If necessary, the material may be machined to a specified configuration as step 108, thereby defining a final bore sub-element.

As previously stated, a body sub-element may be formed subsequent to, or simultaneously with, the formation of the bore sub-element. Accordingly, provided as step 200 is a NiAl intermetallic based alloy material, and more particularly a $Ni_3Al$ intermetallic based alloy material, for fabricating a body sub-element, similar to the body sub-element described in FIG. 6. In one embodiment, the $Ni_3Al$ intermetallic based alloy initially undergoes atomization, as step 200, by powder metal manufacturing techniques and then hot isostatic pressing (HIP) as step 202. More specifically, the Ni$_3$Al intermetallic based alloy material is subjected to elevated temperatures and pressures to fabricate a fully dense billet capable of inspection using available technologies. As previously described, hot isostatic processing (HIP) allows for the formation of consolidated material. The consolidated material is next machined into a specified configuration, as step 208 and definition of the final body sub-element.

In an alternate embodiment, compaction of the Ni$_3$Al powder may be achieved by extrusion, as step 204, to fabricate an inspectable billet. The extruded material undergoes an isothermal forging process as step 206, prior to machining of the forged material into a specified configuration, as step 208 and definition of the final body sub-element.

The body sub-element and the bore sub-element are next pressed together, as step 300, through application of force on one or both of them, thereby contacting the bore sub-element and the body sub-element at their mating surfaces described with regard to FIG. 2. The bore sub-element and the body sub-element undergo a joining process, as step 302, to join the two sub-elements and define a joined assembly.

The joining process preferably utilizes diffusion bonding techniques that are an advantageous method of joining the bore sub-element to the body sub-element. Alternatively, the bore sub-element and the body sub-element may be joined using inertia welding techniques. During a diffusion bonding process, the bore sub-element and the body sub-element undergo a brazing process followed by a HIP diffusion cycle. During an inertia welding process, stored rotational kinetic energy provides the energy needed to make the weld. Generally, in inertia welding, a first work piece is connected to a flywheel. A separate work piece, the one to which the first work piece is to be joined, is restrained from rotating. The flywheel is accelerated to a desired rotational speed. The two pieces are then forced into contact. The kinetic energy stored in the rotating work piece and the flywheel is dissipated as heat through friction at the weld interface. If desired, during a diffusion bonding process or an inertia welding process, the two work pieces may be pressed together through application of force on one or both of them. The machines employed in either a diffusion bonding process or inertia welding process are versatile in that they can accommodate a wide range of part shapes and sizes. During diffusion bonding, standardized cleaning processes ensure the mating surfaces are clean and free from contaminants present on the mating surfaces prior to bonding. A joint that results from diffusion bonding may be free from voids, inclusion, an extensive heat affected zone, deleterious materials, uniform, precisely located, and repeatedly fabricated. During inertia welding, all defects present at the initial mating interface are eliminated with the result that defects in the bond are minimized. A joint that results from inertia welding may be free from voids, inclusion, deleterious materials, fabricated from as-machined surfaces, and repeatedly fabricated. Finally, as the processes are machine-controlled, they may minimize variations that occur through the human element.

After joining, the joined assembly may be machined in a step 304, using a combination of conventional and non-conventional machining processes, for further definition of a final composite structure. Conventional machining processes may employ, but are not limited to, turning, milling, hole drilling, chemical etch, broach, grinding, hand finish, and shot peening. Non-conventional machining processes may employ, but are not limited to, electrochemical machining (ECM) and electro discharge machining (EDM), and laser shock peening.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method for fabricating a machinable structure comprising the steps of:
    providing a bore sub-element comprising a γ/γ' powder metal (PM) nickel based superalloy;
    providing a body sub-element comprising a nickel aluminide intermetallic based alloy, the nickel aluminide intermetallic based alloy having improved strength and oxidation resistance when exposed to temperatures in a range of between about 1250° F. to about 1500° F., that is greater than a strength of the γ/γ' powder metal (PM) nickel based superalloy, when the γ/γ' powder metal (PM) nickel based superalloy is exposed to temperatures in the range;
    contacting the bore sub-element and the body sub-element;
    joining the bore sub-element and the body sub-element; and
    machining to define the machinable structure.

2. A method as claimed in claim 1, wherein the step of providing the bore sub-element comprises providing a γ/γ' powder metal (PM) nickel based superalloy, extruding the γ/γ' powder metal (PM) nickel based superalloy to form an extruded billet, and isothermally forging the extruded billet to form a forged material having a grain size in a range of ASTM 10-12, and machining the forged material to a specified configuration thereby defining the bore sub-element.

3. A method as claimed in claim 1, wherein the step of providing the bore sub-element comprises providing a γ/γ' powder metal (PM) nickel based superalloy, hot isostatic pressing (HIP) the γ/γ' powder metal (PM) nickel based superalloy to a super solvus condition thereby forming a consolidated material having a grain size in a range of ASTM 7-9, and machining the consolidated material to a specified configuration thereby defining the bore sub-element.

4. A method as claimed in claim 1, wherein the step of providing the body sub-element comprises providing an atomized powder Ni$_3$Al intermetallic based alloy, hot isostatic pressing (HIP) the atomized powder Ni$_3$Al intermetallic based alloy to a consolidated billet, inspecting the consolidated billet, and machining the consolidated billet to a specified configuration thereby defining the body sub-element.

5. A method as claimed in claim 1, wherein the step of providing the body sub-element comprises providing an atomized powder Ni$_3$Al intermetallic based alloy, extruding the atomized powder Ni$_3$Al intermetallic based alloy to form an extruded billet, inspecting the extruded billet, machining the extruded billet to a specified configuration and form a machined stock, and isothermal forging the machined stock to define the body sub-element.

6. A method as claimed in claim 1, wherein the step of contacting further comprises contacting the bore sub-element and the body sub-element at a plurality of mating surfaces to define a mating interface.

7. A method as claimed in claim 1, wherein the step of joining the bore sub-element to the body sub-element includes joining through an inertia welding process.

8. A method as claimed in claim 1, wherein the step of joining the bore sub-element to the body sub-element includes joining through a solid state diffusion bonding process.

9. A method as claimed in claim 8, wherein the solid state diffusion bonding process comprises vacuum brazing the bore sub-element and the body sub-element followed by a hot isostatic pressing (HIP) diffusion cycle.

10. A composite structure comprising:
   a bore sub-element wherein the bore sub-element comprises a powder metal (PM) nickel based superalloy; and
   a body sub-element wherein the body sub-element comprises a nickel aluminide intermetallic based alloy and wherein the bore sub-element and the body sub-element are joined at a mating interface.

11. The composite structure as claimed in claim 10, wherein the bore sub-element comprises a grain size in a range of ASTM 7.0 to 9.0.

12. The composite structure as claimed in claim 10, wherein the body sub-element comprises a $Ni_xAl$ intermetallic based alloy, where x=3.

13. The composite structure as claimed in claim 12, wherein the body sub-element comprises $Ni_3Al$.

14. The composite structure as claimed in claim 10, wherein the nickel aluminide intermetallic based alloy has greater creep resistance properties and oxidation resistance relative to the nickel based superalloy and the nickel based superalloy has higher strength properties than the nickel aluminide intermetallic based alloy when the nickel alumnide intermetallic based alloy and the nickel based superalloy are exposed to temperatures in a range of between about 1250° F. to about 1500° F.

15. The composite structure as claimed in claim 10 comprising a turbine impeller.

* * * * *